US011582326B1

(12) United States Patent
Lukyanenko et al.

(10) Patent No.: US 11,582,326 B1
(45) Date of Patent: Feb. 14, 2023

(54) SCALABLE MESSAGING FRAMEWORK FOR PROVIDING MACHINE LEARNING SERVICES ACROSS MULTIPLE AVAILABILITY ZONES

(71) Applicant: PAYPAL, INC., San Jose, CA (US)

(72) Inventors: Nikita Alekseyevich Lukyanenko, San Jose, CA (US); Alexander Y. Shvid, Las Vegas, NV (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/394,920

(22) Filed: Aug. 5, 2021

(51) Int. Cl.
*H04L 67/60* (2022.01)
*H04L 67/143* (2022.01)
*G06N 20/00* (2019.01)
*H04L 67/141* (2022.01)

(52) U.S. Cl.
CPC ............ *H04L 67/60* (2022.05); *G06N 20/00* (2019.01); *H04L 67/141* (2013.01); *H04L 67/143* (2013.01)

(58) Field of Classification Search
None
See application file for complete search history.

(56) References Cited

U.S. PATENT DOCUMENTS

| | | | | |
|---|---|---|---|---|
| 10,956,880 | B2 * | 3/2021 | Towle | H04L 67/1001 |
| 11,410,075 | B2 * | 8/2022 | Pal | G06N 20/00 |
| 11,451,491 | B2 * | 9/2022 | Sindhu | H04L 49/00 |
| 2011/0202909 | A1 * | 8/2011 | Meijer | G06F 8/45 717/151 |
| 2012/0297249 | A1 * | 11/2012 | Yang | G06F 9/5072 714/E11.131 |
| 2022/0232082 | A1 * | 7/2022 | Iyer | H04L 67/104 |
| 2022/0239758 | A1 * | 7/2022 | Klein | H04L 67/10 |
| 2022/0263877 | A1 * | 8/2022 | Conlin | H04L 65/4053 |
| 2022/0283866 | A1 * | 9/2022 | Cannata | G06F 9/5027 |
| 2022/0303829 | A1 * | 9/2022 | Caswell | H04W 28/08 |

FOREIGN PATENT DOCUMENTS

| | | | | |
|---|---|---|---|---|
| EP | 3169038 A1 * | 5/2017 | | G06F 16/9558 |
| WO | WO-2019042312 A1 * | 3/2019 | | G06F 16/24568 |

OTHER PUBLICATIONS

Zeng et al. Distributed Computer Environment: Approaches and Applications. IEEE. 2007. pp 3240-3243 (Year: 2007).*

* cited by examiner

*Primary Examiner* — Uzma Alam
(74) *Attorney, Agent, or Firm* — Haynes and Boone, LLP

(57) ABSTRACT

Methods and systems are presented for providing a scalable communication framework for facilitating computing services to computer nodes across multiple availability zones. One or more communication servers act as a communication proxy for a processing server configured to perform the computing services. Upon receiving a service request from a computer node, the communication server establishes a synchronous communication session with the computer node. The communication server generates a request message and inserts the request message in a downstream queue accessible by the processing server. The processing server retrieves the request message from the downstream queue and performs the computing services based on the request message. Outputs from the computing services are encapsulated within a response message and then inserted in an upstream queue. The communication server extracts output data from the response message, and transmits the output data to the computer node via the synchronous communication session.

20 Claims, 6 Drawing Sheets

US 11,582,326 B1

SCALABLE MESSAGING FRAMEWORK FOR PROVIDING MACHINE LEARNING SERVICES ACROSS MULTIPLE AVAILABILITY ZONES

BACKGROUND

The present specification generally relates to remote computing, and more specifically, to providing a scalable communication framework for facilitating computer services to computer nodes according to various embodiments of the disclosure.

Related Art

The interconnectedness of devices enables remote services to be provided to devices that cannot otherwise access such services for a variety of reasons. For example, certain computing services may require a large amount of computer processing power that can only be performed by specialized machines such as supercomputers. Due to the cost and size of such specialized machines, the computing services may only be performed by a limited number of devices and at a limited number of locations. As such, in order to make the computing services widely available, each provider of such computing services may be required to service requests from a large number of devices across multiple regions.

To exacerbate the problem, due to the complexity of the computing services, the time to service each request may be substantially long. It is, therefore, a challenge to provide these types of computing services to a large number of devices. Thus, there is a need for a scalable framework that provides complex computing services to devices across multiple regions.

Figure 1:
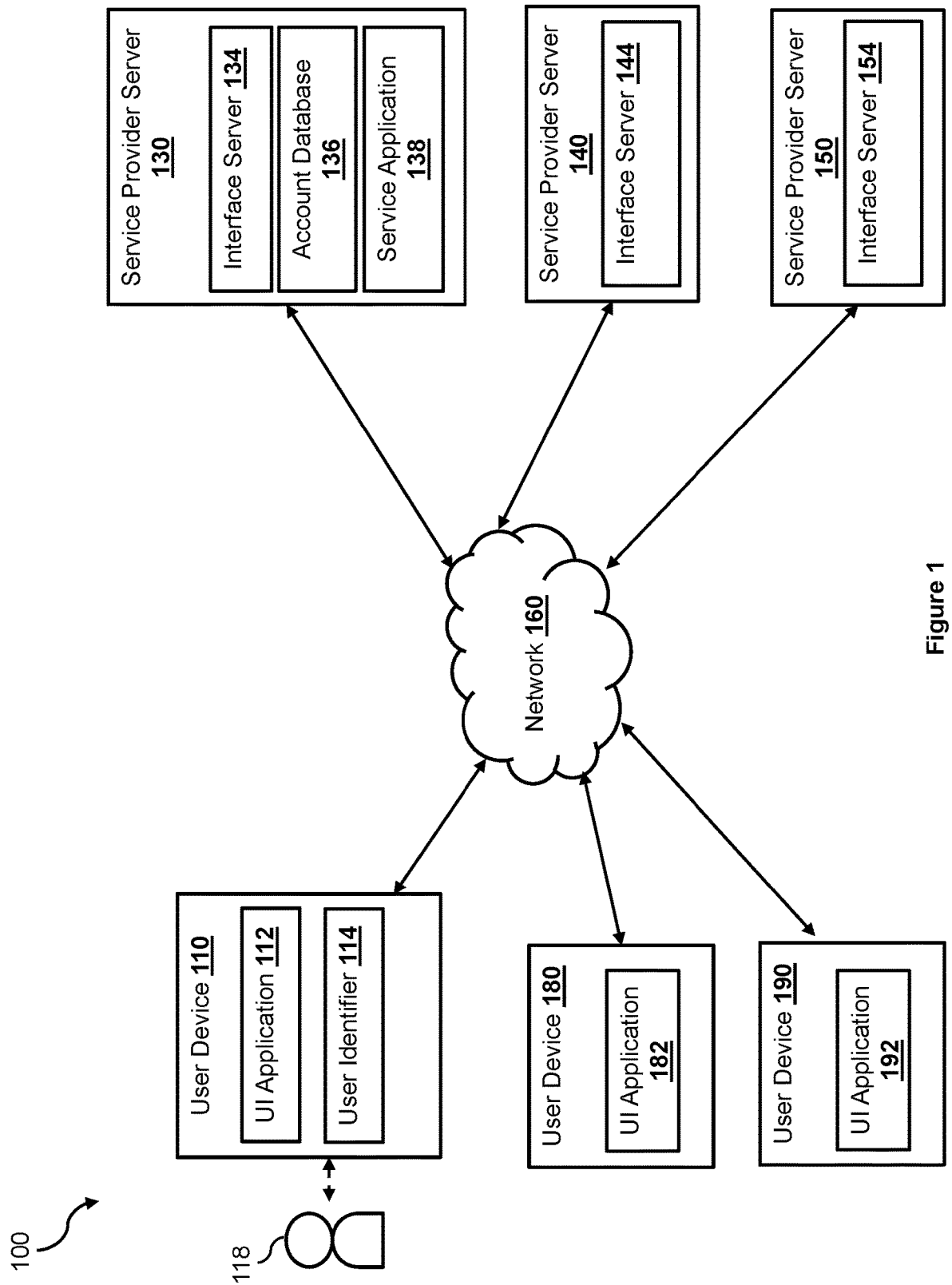
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a scalable communication framework for facilitating computing services to computer nodes across multiple availability zones. As discussed above, it is a challenge to provide computing services remotely to different computer nodes (devices or servers that access the computing services), especially when the computing services are provided to computer nodes across multiple networks and geographical regions. For example, the processing server that is configured to provide the computer service is likely located deep within a data center network for security reasons, while computer nodes that provide general services (e.g., web services) to user devices are located in proximity geographically to the user devices. On the other hand, computer nodes configured to provide an interface to user devices through front-end applications (e.g., web servers, application servers, etc.) are located close to the user devices across different networks and/or geographical regions. Front-end applications typically require synchronous, real-time communications for interacting with the user devices. Thus, when a request (e.g., a web request) is received from a user device, a synchronous communication session may need to be established between the front-end application and the user device. The synchronous communication session may be maintained until the user device terminates the session or the front-end application determines that the request has been serviced. Based on this requirement, the front-end applications are well-equipped to communicate with other devices using synchronous communication sessions, but may not be equipped to perform other types of communications (e.g., asynchronous communications).

However, maintaining the synchronous communication sessions could take up essential computer resources. As discussed herein, the computing service performed by the processing server may include complex tasks such as sophisticated machine learning and modeling. When the computing service requires substantial processing power, the tasks for maintaining the synchronous communication sessions can dramatically reduce the performance (e.g., speed, efficiency, etc.) of the processing server in performing the computing service. Furthermore, due to the complexity and time required to perform the computing service by the processing server, the number of synchronous communication sessions required to be maintained at any given time may be large, which further reduces the performance of the server.

Thus, according to various embodiments of the disclosure, a communication system may provide a scalable communication framework that allows a large number of computer nodes to request computing services from the processing server at any given time while reducing the burden of the processing server to manage the requests from the computer nodes. In some embodiments, the scalable communication framework includes a two-tiered framework: a first tier of communication that is synchronous between one or more communication servers and the computer nodes and a second tier of communication that is asynchronous between the one or more communication servers and the processing server configured to perform the computing service.

In some embodiments, the communication server(s) may act as a proxy for the server and may be configured to receive requests from one or more computer nodes as part of the first tier of communication within the scalable communication framework. Based on the requirements of the computer nodes, the communication server(s) may establish and/or maintain various synchronous communication sessions with the computer nodes during the processing of the requests. For example, a communication server may establish a synchronous communication session (e.g., a transfer control protocol (TCP) Internet protocol (IP) session, etc.) in response to receiving a request for a computing service from a computer node. The communication server may maintain the synchronous communication session with the computer node until the request is serviced. For example, the synchronous communication session may be terminated after a response including response data is transmitted to the computer node. The communication server may receive requests from different nodes. Since it may take a substantial amount of time (e.g., several milliseconds, several seconds, etc.) for the processing server to perform the computing service, the communication server may be required to maintain multiple synchronous communication sessions (and sometimes a large number of sessions depending on traffic and demands) with different computer nodes in parallel, while waiting for the processing server to perform the computing service for the different requests and to generate responses for the different requests. Managing the multiple synchronous communication sessions can take up a substantial amount of computing resources as discussed herein. However, since the communication system enables the communication server(s) to manage the communication sessions with the computer nodes, it takes the burden away from the processing server such that the processing server can utilize its computing resources efficiently to perform the computing service.

In some embodiments, to further improve the scalability of the communication framework, the communication system may provide multiple communication servers for managing requests transmitted from different computer nodes. For example, multiple availability zones may be determined based on different networks or different geographical areas associated with the computer nodes, where one or more communication servers may be configured to process requests transmitted from each of the availability zones.

In some embodiments, the communication system may configure the communication server(s) to communicate with the processing server using one or more asynchronous communication techniques as part of the second tier of communication within the scalable communication framework. For example, the communication server(s) may be configured to communicate with the processing server using a messaging system. In some embodiments, one or more messaging servers may be configured to manage messaging queues (also referred to as "topic queues") for the asynchronous communications between the communication server(s) and the processing server. As defined herein, a messaging queue can be implemented using any one of a variety of software data structure, including an array, a list, a buffer, a queue, or other data structure that can store multiple messages and support the functionality of inserting messages and popping messages. Different topic queues may be established. For example, a downstream queue may be used for storing downstream messages flowing from the communication server(s) to the processing server, and an upstream queue may be used for storing upstream messages flowing from the processing sever back to the communication server (s). In addition, when multiple computing services are provided by the processing server (or multiple processing server), different downstream and upstream queues may be generated for the different computing services.

In some embodiments, when a communication server receives a request for a computing service from a computer node, the communication server may establish a synchronous communication session with the computer node. The communication server may also generate a request message for the request. The request message may include data associated with the computing service (e.g., input data for performing the computing service, etc.), a device identifier identifying the computer node from which the request is received, and a session identifier identifying the synchronous communication session established between the communication server and the computer node for the request. In the case where multiple communication servers are provided within the communication framework, the request message may also include a server identifier identifying a particular one of the communication servers. The communication server may then insert the request message to a downstream queue managed by the messaging server. As the communication server (and/or other communication servers) continues to receive requests from different computer nodes, the communication server (and/or other communication servers) may continue to generate request messages and insert the request messages in the downstream queue.

In some embodiments, the communication server may determine that the request from the computer node requires performance of multiple computing services (e.g., different computing services performed by different processing servers or by different machine learning models hosted in the same processing server). When the communication server determines that the request requires performance of multiple computing services, the communication server may generate multiple request messages, each request message corresponding to each computing service. Each of the request messages may include corresponding input data for performing the computing services, based on the request received from the computer node. Furthermore, each of the request messages may also include the same identifiers (e.g., the device identifier, the server identifier, the session identifier, etc.) since the request messages all correspond to the same request. The communication server may then insert the request messages in the corresponding downstream queues. For example, if the required computing services are different iterations of the same computing service, the communication server may insert the request messages in the same downstream queues. However, if the required computing services are different computing services, the communication server may insert the request messages in the corresponding downstream queues.

The processing server may be configured to monitor the downstream queue. For example, the processing server may retrieve a request message (e.g., an oldest message, a newest message, etc.) from the downstream queue every time after the processing server has completed performing the computing service. In another example, the processing server may monitor the downstream queue periodically when the processing server is not busy (e.g., idling, not performing any computing services, etc.). Upon retrieving the request message, the processing server may remove the request message from the downstream queue and may perform the computing service based on the request message (e.g., using the input data included in the request message to perform the computing service).

When the processing server finishes the performance of the computing service based on the request message, the processing server may generate a response message. The response message may include the device identifier, the server identifier, the session identifier, and also response data generated based on the performance of the computing service. The processing server may then insert the response message in an upstream queue.

In some embodiments, the communication server may be configured to monitor the upstream queue(s). For example, the communication server may perform a scan of the upstream queue(s) periodically (e.g., every 10 milliseconds, every second, etc.) to determine whether a response message corresponding to the communication server is stored in the upstream queue. When scanning an upstream queue, the communication server may access the data within each response message stored in the upstream queue, and determine whether the response message corresponds to the communication based on the server identifier, the device identifier, and/or the session identifier included in the response message. The communication server may scan the response messages in the upstream queue in an order (e.g., from oldest to newest, etc.). When the communication server determines a response message corresponding to the communication server, the communication server may retrieve the response message and remove the response message from the upstream queue. The communication server may extract response data from the response message, and may transmit the response data to the computer node as a response to the request.

If the request requires only one computing service or that all of the computing services have been completed, the communication server may terminate the synchronous communication session with the computer node after transmitting the response data to the computer node. However, if the request requires additional computing services that have not been completed, the communication server may maintain the synchronous communication session until all of the response data is received and transmitted to the computer node. In some embodiments, the communication server may transmit the response data extracted from each response message separately to the computer node. Thus, the communication server may transmit different response data to the computer node as the communication server retrieves the different response messages at different times. In some embodiments, the communication server may be configured to transmit the transmit the response data generated based on the performance of different computing services as a whole (e.g., a package, etc.). For example, when the communication server extracts response data from a response message, the communication server may store the response data temporarily and withhold from transmitting the response data to the computer node while awaiting other response data. The communication server may continue to monitor for additional response messages associated with the request, and may extract additional response data from other response messages associated with the request. When the communication server determines that all of the requested computing services are completed, the communication server may compile the response data (e.g., in a package, in a stream, etc.), and transmit the packaged response data to the computer node via the synchronous communication session. The communication server may then terminate the synchronous communication session.

As discussed herein, computer nodes may be divided into multiple regions (also referred to as "availability zones") based on networks or geographical locations associated with the computer nodes. In some embodiments, different communication servers may be provided to serve requests from computer nodes in different availability zones. In order to eliminate the need to maintain constant communications between communication servers associated with different availability zones, the messaging server may generate multiple copies of the queues (e.g., the downstream queue, the upstream queue, etc.) for the different availability zones. The processing server may be configured to monitor only one instance of the queues (e.g., the queues that are stored within the same network or same availability zone as the processing server, etc.). The messaging server may be configured to synchronize the queues across different availability zones such that the queues are identical across the different availability zones (e.g., mirroring). When a communication server associated with an availability zone generates a request message, the communication server may insert the request message into a local copy of the downstream queue. The local copy of the downstream queue may not be the queue accessible by the processing server. However, the messaging server may synchronize the queues across the different availability zones such that the newly inserted request message is added to the different copies of the downstream queue (including the copy of the downstream queue accessible by the processing server).

When the processing server generates a response message, the processing server may insert the response message to a local copy of the upstream queue. The local copy of the upstream queue may or may not be located in the same availability zone as the communication server that generated the corresponding request message. Similarly, the messaging server may synchronize the copies of the upstream queue across the different availability zones such that the newly inserted response message is inserted into all of the copies of the upstream queue (including the copy of the upstream queue accessible by the communication server).

The two-tier communications in the scalable communication framework utilizes the communication server(s) and the messaging server to facilitate the synchronous communications with the computer nodes and asynchronous communications with the processing server such that the processing server can focus on performing the computing services while the communication server(s) manages the synchronous communications with the various computer nodes. Due to the nature of asynchronous communications, the processing server is required to provide only minimum resources in managing the requests (e.g., the request messages), thus enhancing the efficiency of the processing server in performing the computing services.

FIG. 1 illustrates a networked system 100, within which the communication system may be implemented according to one embodiment of the disclosure. Note that the present techniques may be applied in many different computing and technological environments, however, and are not limited to those shown in the figures. The networked system 100 includes multiple service provider servers 130, 140, and 150 (also referred to as "computer nodes") configured to interface with user devices 110, 180, and 190 via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 118 to interact with the service provider servers 130, 140, and 150 over the network 160. The user 118 may be a natural person or an entity (e.g., a corporation, a partnership, an organization, etc.). For example, the user 118 may use the user device 110 to conduct an online transaction with one of the service provider servers 130, 140, and 150 via websites hosted by, or mobile applications associated with, the service provider servers 130, 140, and 150. The user 118 may also log in to a user account to access account services or conduct electronic transactions (e.g., fund transfers, payments, purchase transactions, data access transactions, etc.) with any one of the service provider servers 130, 140, and 150. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 118 to interact with any one of the service provider servers 130, 140, and 150 over the network 160. In one implementation, the user interface application 112 includes a software program (e.g., a mobile application) that provides a graphical user interface (GUI) for the user 118 to interface and communicate with the service provider servers 130, 140, and 150 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to any one of the service provider servers 130, 140, and 150 via the network 160, and the identifier 114 may be used by the service provider servers 130, 140, and/or 150 to associate the user 118 with a particular user account (e.g., and a particular profile) maintained by the service provider servers 130, 140, and 150.

In various implementations, the user 118 is able to input data and information into an input component (e.g., a keyboard) of the user device 110. For example, the user 118 may use the input component to interact with the UI application 112.

Each of the user devices 180 and 190 may be implemented in a similar manner as the user device 110. For example, each of the user devices 180 and 190 may be operated by a user (e.g., the same or a different user from the user 118) to interact with other devices, such as any one of the service provider servers 130, 140, and 150 via the network 160, using UI applications 182 and 192, respectively. Furthermore, each of the user devices 180 and 190 may include a respective user identifier, which may be passed to any one of the service provider servers 130, 140, and 150 so that the service provider server may identify a particular user account for the user of the user devices 180 and 190. While only three user devices 110, 180, and 190 are shown in FIG. 1, it has been contemplated that additional user devices, each associated with a different user account, may be connected to the service provider servers 130, 140, and 150 via the network 160.

In one example, the service provider server 130 may be maintained by a transaction processing entity or an online service provider, which may provide processing for electronic transactions between the users of the user device 110 and one or more merchants or other types of payees. It is noted that the service provider server 130 may be, in other examples, associated with other service providers, such as a data storage provider, a banking institute, or an e-commerce provider (e.g., an online retailer, etc.). In the example where the service provider server 130 is maintained by a transaction processing entity, the service provider server 130 may include a service application 138, which may be adapted to interact with the user devices 110, 180, and 190 over the network 160 to facilitate the searching, selection, purchase, payment of items, fund transfers, transaction authentication, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application can settle indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 118, users of the user devices 180 and 190, etc.) may access a user account associated with the user and access various services offered by the service provider server 130 (e.g., conduct various transactions such as payment transactions, data access transactions through a user account of the user), by generating HTTP requests directed at the service provider server 130.

The service provider server 130, in one embodiment, may be configured to maintain one or more user accounts in an account database 136, each of which may be associated with a profile and may include account information associated with one or more individual users. In one implementation, a user may have credentials to authenticate or verify identity with the service provider server 130. Thus, the service provider server may store the credentials of the users in corresponding records of the account database 136 associated with the user accounts.

Since users of the service provider (and also their user devices) may be located in different geographical locations (e.g., in different cities, different states, different countries, etc.), the service provider may implement different service provider servers, each similar to the service provider server 130, in different geographical locations to serve user devices that are within different regions. For example, service provider servers 140 and 150 may be provided, in addition to the service provider server 130, to service user devices in different regions (e.g., different geographical regions separated by geographical boundaries and/or computer networks). In some embodiments, each of the service provider servers 140 and 150 are implemented in a similar manner as the service provider server 130. For example, each of the service provider servers 140 and 150 may include a respective interface server (e.g., the interface servers 144 and 154) configured to provide an interface (e.g., a user interface such as a webpage) on user devices within their respective regions.

Figure 2:
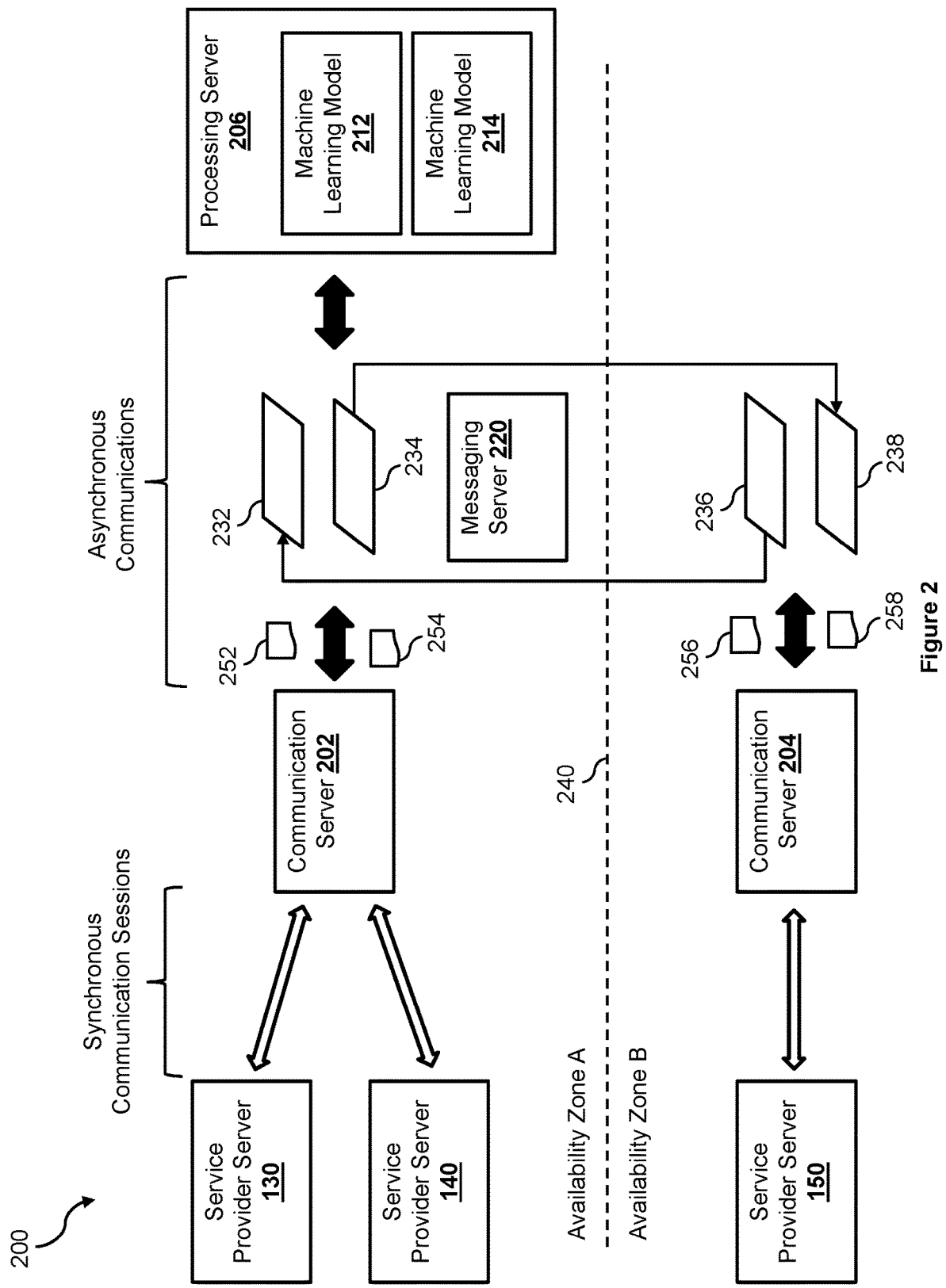
FIG. 2 illustrates an example implementation of a scalable communication framework according to an embodiment of the present disclosure.

FIG. 2 illustrates a scalable communication framework 200 being implemented within the networked system 100 to provide computer nodes (e.g., the service provider servers 130, 140, and 150) access to computing services. As shown in the figure, service provider servers 130, 140, and 150 are configured to provide services to and interact with user devices (e.g., the user devices 110, 180, and 190, etc.). Since the user devices may be large in number and may be scattered across different regions, different service provider servers may be configured to provide services to different user devices based on their regions. In this example, two regions (also referred to as "availability zones") are defined. The two availability zones may be defined based on geographical boundaries (e.g., different cities, different states, different countries, etc.) and/or based on different networks (e.g., different local area networks, different wide area networks, etc.). Depending on the demands, different numbers of computer nodes may be provided in different available zones. In this example, two computer nodes (e.g., the service provider servers 130 and 140) are provided in the availability zone 'A,' while one computer node (e.g., the service provider server 150) is provided in the availability zone 'B.' Depending on which region a user device is associated with at the time the user device requests services from the service provider, a particular service provider server within that region will be assigned to service and interact with the user device.

In order to provide certain services to the user devices (e.g., the user devices 110, 180, and 190, etc.), the service provider servers 130, 140, and 150 may require access to certain computing services. As discussed herein, it may not be possible or practical for certain computing services to be performed by devices such as the service provider servers 130, 140, and 150. These computing services may be very complex and may require a large amount of computing resources such that it can only be implemented within specialized computers such as supercomputers. An example of such a computing service may include providing a summarized version of an electronic dialogue between a user (e.g., the user 118) and the service provider (e.g., an agent of the service provider, a chatbot, etc.). Performing such a computing service may require the use of complex machine learning model(s) to ingest a large amount of data (e.g., a history of the conversation between the user and the service provider) and to distill it down to a brief summary relevant to a current conversation.

Due to the cost and size of such supercomputers, only a limited number of such computers (e.g., processing servers) may be made available for performing the computing services. In this example, a processing server 206 may be configured to perform the computing services for a number of computer nodes (e.g., the service provider servers 130, 140, and 150) across the multiple availability zones. According to various embodiments of the disclosure, the scalable communication framework 200 enables the processing server 206 to provide computing services for different computer nodes across multiple availability zones efficiently.

In some embodiments, the scalable communication framework 200 includes one or more communications servers configured to interface with the computer nodes (e.g., the service provider servers) via synchronous communication sessions and a messaging server 220 configured to facilitate asynchronous communications between the communication servers and the processing server 206. In this example, a communication server 202 is configured to interface with the service provider servers 130 and 140 in availability zone 'A' and a communication server 204 is configured to interface with the service provider serer 150 in availability zone 'B.'

Each of the service provider servers 130, 140, and 150 is configured to provide an interface (e.g., a webpage, a mobile application interface, etc.) via which to interact with users (e.g., the user 118, etc.). A user may, via the interface presented on the user device, access data and requests for services (e.g., initiating a dispute, performing a fund transfer transaction, editing data associated with a user account, etc.). In some embodiments, the interface provided by the service provider servers 130, 140, and 150 may include an online chat interface that enables the user to chat with an agent of the service provider (e.g., a human agent, a chatbot, etc.).

In some embodiments, in order to provide the services requested by the user, the service provider server may require certain computing services that are performed by the processing server 206. For example, when a user (e.g., the user 118) initiates a chat session with the service provider via the interface provided by a service provider server (e.g., the service provider server 130), an agent of the service provider may need to determine a context based on historical correspondence with the user. Thus, the service provider server 130 may determine a summary of the previous correspondence with the user 118, and may present the summary to the agent. Since the generation of the summary is a complex computing task that requires substantial computing resources using one or more complex machine learning models, the service provider server 130 may not have the processing power to performing the computing service. Instead, the service provider server 130 may request the processing server 206 to perform the computing service.

Due to technical networking requirements, the front-end applications (e.g., the interface servers 134, 144, 154, etc.) are configured to communicate with other devices (e.g., the user devices 10, 180, 190, etc.) via a synchronous communication session (e.g., TCP/IP session). However, as discussed herein, maintaining synchronous communication sessions, especially when the number of sessions to be maintained at any given time may be large, can take up a substantial amount of computing resources. For example, a server has to constantly (e.g., periodically) perform a predetermined handshake (e.g., transmit data and acknowledge receipt of data) with the connected devices to keep the sessions alive. In an extreme case, the resources required for maintaining a large number of synchronous communication sessions may cripple a server as the tasks required to be performed to maintain the sessions take up a large portion of the processing cycles. As such, requiring the processing server 206 to maintain synchronous communication sessions with the service provider servers 130, 140, and 150 may be detrimental to its performance, as it takes away resources that can be used in performing more important tasks, such as performing the computing services.

Thus, according to various embodiments of the disclosure, the scalable communication framework 200 enables the communication servers 202 and 204 to interface with the computer nodes (e.g., the service provider servers 130, 140, 150, etc.) via synchronous communication sessions and provides an asynchronous communication mechanism for facilitating communication between the communication servers 202 and 204 and the processing server 206. In some embodiments, the asynchronous communication is implemented using a messaging protocol (e.g., Apache Kafka® messaging system). For example, the messaging server 220 may maintain one or more messaging queues accessible by the communication servers 202 and 204, and the processing server 206. In some embodiments, the messaging server 220 may maintain one or more downstream queues for storing messages sent from the communication servers to the processing server, and one or more upstream queues for storing messages sent from the processing server 206 back to the communication servers. Each of the messaging queues (e.g., the messaging queues 232, 234, 236, and 238) is a data structure (e.g., an array, a stack, etc.) maintained by the messaging server 220 for storing one or more messages. The messaging server 220 may configure the messaging queues to store messages in an order based on the time that the messages are inserted, such that a device (e.g., a communication server, the processing server 206, etc.) may determine which message is older, and which message is newer based on the order of the message within the queue. By inserting messages and monitoring messages in the messaging queues, communication between the communication servers and the processing server 206 may be established.

Using the scalable communication framework 200, when the service provider server 130 requires access to the computing services performed by the processing server 206, the service provider server 130 may transmit a service request to the communication server 202. The service request may specify one or more services to be performed by the processing server 206 (e.g., using one or more of the machine learning models 212 and 214). The transmission of the service request may cause a synchronous communication session (e.g., a TCP/IP session) to be established (e.g., by the communication server 202 or the service provider server 130). Once the synchronous communication session is established, the communication server 202 may store data associated with the session, such as a device identifier associated with the service provider server 130, a session identifier associated with the established session, and other information pertaining to the communication with the service provider server 130. In some embodiments, since the service provider server 130 may interface with multiple user devices at the same time (e.g., in parallel), the service provider server 130 may transmit multiple service requests to the communication server 202, each based on communications with a different user device. Thus, the communication server 202 may maintain multiple synchronous communication sessions with the service provider server 130 at any given time. Due to the possibility of having multiple sessions with the same service provider server, the session identifier, in addition to the device identifier, enables the communication server 202 to differentiate among the service requests transmitted through different synchronous communication sessions.

In some embodiments, based on the service request transmitted by the service provider server 130, the communication server 202 may generate one or more request messages (e.g., a request message 252). The request message 252 may include identification information identifying the service request. For example, the request message 252 may include the device identifier identifying the service provider sever 130, a session identifier identifying the synchronous communication session between the communication server 202 and the service provider server 130 for the service request, and a server identifier identifying the communication server 202. The request message 252 may also include input data for the computing service. For example, the input data may include an account identifier identifying a user account associated with the user 118, who initiated the chat session with the service provider server 130. The input data may also include additional context data (e.g., an Internet Protocol (IP) address of the user device 110, a geographical location of the user device 110, etc.).

After generating the request message, the communication server 202 may insert the request message 252 in a downstream queue (e.g., queue 232) managed by the messaging server 220. In some embodiments, the communication server 202 may determine that the service request received from the service provider server 130 may require multiple services to be performed by the processing server 206 (e.g., requiring outputs from both the machine learning model 212 and the machine learning model 214). Thus, the communication server 202 may generate multiple request messages, each for a distinct service to be performed by different components of the processing server 206. In some embodiments, the communication server 202 may insert all of the request messages associated with the different services in the same downstream queue 232. In some embodiments, the messaging server 220 may generate and manage different downstream queues for different services (e.g., one downstream queue for services to be performed by the machine learning model 212 and another downstream queue for services to be performed by the machine learning model 214). When multiple downstream queues are associated with distinct services, the communication server 202 may insert the request messages in the respective downstream queues.

The communication server 202 may continue to receive new service requests from other user devices (e.g., the user device 180). When the communication server 202 receives a new service request, the communication server 202 may perform the same steps as discussed herein to establish a synchronous communication session with the user device that transmitted the new service request, generate one or more new request messages, and insert the new request message(s) in one or more downstream queues (e.g., the downstream queue 232). Since each service request is associated with a different synchronous communication session, the communication server 202 may differentiate the different service requests based on the session identifiers.

As shown in FIG. 2, the communication server 202 may be communicatively coupled to other computer nodes (e.g., other service provider servers such as the service provider server 140) within the availability zone 'A.' As such, the communication server 202 may also receive service requests from the service provider server 140 (or other service provider servers within the availability zone 'A'). Similar to handling the service requests from the service provider server 130, the communication server 202 may establish a synchronous communication session with the service provider server 140 for this service request. The communication server 202 may also generate another request message, except that this request message may include a device identifier identifying the service provider server 140 and a session identifier identifying the synchronous communication session established between the communication server 202 and the service provider server 140 for this service request. The communication server 202 may insert the request message in the downstream queue 232.

In some embodiments, in order to enhance the performance of the processing server 206 in processing these service requests, as implemented within the request messages, the message queues are implemented by the messaging server 220 locally to the processing server 206. In this example, since the processing server 206 is located within the same availability zone (e.g., the availability zone 'A') as the communication server 202, the request messages can be inserted in the downstream queue 232 locally to the communication server 202. However, as discussed herein, due to the cost and other factors associated with such processing servers (e.g., the processing server 206) that are capable of performing the computing services, a processing server may not be provided in every availability zone. In this example, the processing server 206 configured to perform the computing services are provided in availability zone 'A' but no processing server 206 is provided in availability zone 'B.' Thus, the processing server 206 is required to perform computing services for communication servers in other availability zones as well, such as the communication server 204 in the availability zone 'B.'

For example, the communication server 204 may also receive service requests from computer nodes within the availability zone 'B' (e.g., the service provider server 150, etc.). The communication server 204 may be configured to perform similar functionalities as the communication server 202. Thus, upon receiving a service request from the service provider server 150, the communication server 204 may establish a synchronous communication session with the service provider server for the service request. The communication server 204 may also generate one or more request messages (e.g., a request message 256) for the service request. The request message 256 may include a device identifier identifying the service provider server 150, a session identifier identifying the synchronous communication session established between the communication server 204 and the service provider server 150 for the service request, and a server identifier identifying the communication server 204. The request message 256 may also include input data for performing the computing services.

Instead of inserting the request message 256 in the downstream queue 232, which is located in the availability zone 'A' and requires the communication server 204 to constantly communicate remotely to a device across a different availability zone, the communication server 204 may insert the request message 256 in a copy of the downstream queue 232 (e.g., the downstream queue 236) that is stored locally (e.g., within the same local network) with the communication server 204. In some embodiments, the messaging server 220 may generate and maintain copies of the downstream queue 232 and copies of the upstream queue 234 in each availability zone, where the local copies may be accessed by the communication server in the same network. The local copies of the queues (e.g., the downstream queue 236 and the upstream queue 238) may be stored within a communication server (e.g., the communication server 204) or on a device within the same local network as the communication server 204. The messaging server 220 is configured to synchronize the messaging queues and their copies (e.g., mirroring), such that new messages that have been inserted to one queue will be copied to other copies of the queue, and that messages being removed (e.g., popped) from one queue will be removed from other copies of the queue. Thus, after the request message 256 is inserted into the local downstream queue 236, the messaging server 220 may copy the request message 256 to the downstream queue 232.

In some embodiments, the processing server 206 is configured to scan messages in the downstream queues (e.g., the downstream queue 232). For example, the processing server 206 may be configured to scan messages when the processing server 206 is idling (e.g., finished performing a computing service), periodically (e.g., every second, every 5 seconds, etc.), and/or in response to (e.g., triggered by) an event (e.g., a new message inserted in the downstream queue 232, etc.). In some embodiments, the process server 206 may retrieve a request message from the downstream queue 232 (e.g., an oldest message within the queue 232) and remove the request message from the queue 232. For example, the process server 206 may retrieve the request message 252 from the downstream queue 232 and remove the request message 252 from the downstream queue 232.

The process server 206 may then perform the computing services requested in the request message 252. For example, the process server 206 may use one or more of the machine learning models 212 and 214 to perform the computing services based on input data included in the request message 252. The computing services may include generating a summary of previous interactions between the user 118 and the service provider. The processing server 206 may generate output data based on the performance of the computing services. The processing server 206 may then generate a response message (e.g., a response message 254) based on the output data. The response message 254 may include the output data generated based on performance of the computing services. The response message 254 may also include the device identifier, the session identifier, and the server identifier included in the corresponding request message 252 such that the communication server 202 may determine that the response message 254 corresponds to the request message 252. The processing server 206 may then insert the response message 254 into an upstream queue (e.g., the upstream queue 234).

After finishing the computing services associated with the request message 252, the processing server 206 may discard the request message 252. The processing server 206 may retrieve another request message from the downstream queue 232, and process the request message. For example, the processing server 206 may retrieve the request message 256 from the downstream queue 232 (that was copied from the downstream queue 236). The processing server 206 may perform the requested computing services using one or more of the machine learning models 212 and 214 based on the input data included in the request message 256, and may generate output data. The processing server 206 may generate a response message 258 based on the output data, in a similar manner as the response message 254 is generated. The response message 258 may include the device identifier, the session identifier, and the server identifier included in the corresponding request message 256 such that the communication server 204 may determine that the response message 258 corresponds to the request message 256. The processing server 206 may insert the response message 258 into the upstream queue 234.

The communication server 202 may be configured to monitor and/or scan messages in the upstream queue 234, for example, periodically (e.g., every second, every 5 seconds, etc.) and/or triggered by an event. When the communication server 202 scans the upstream queue 234, the communication server 202 may determine whether any response message in the upstream queue 234 is relevant to the communication server 202. For example, the communication server 202 may determine that a response message in the upstream queue 234 is relevant to the communication server 202 if the response message includes a server identity corresponding to the communication server 202 and/or a session identity corresponding to one of the synchronous communication sessions maintained by the communication server 202. If the communication server 202 determines that a response message (e.g., the response message 254) is relevant to the communication server 202, the communication server 202 may retrieve the response message 254 from the upstream queue 234 and may remove the response message 254 from the upstream queue 234. The communication server 202 may extract the output data from the response message 254.

Based on the device identifier and the session identifier in the response message 254, the communication server 202 may determine that the response message 254 corresponds to the service request transmitted from the service provider server 130. In some embodiments, the communication server 202 may determine that the output data from the response message 254 forms a complete response to a service request from the service provider server 130. For example, if the communication server 202 determines that only one request message has been generated based on the service request from the service provider server 130, the communication server 202 may determine that the output data completes the service request. The communication server 202 may then transmit the output data to the service provider server 130 via the corresponding synchronous communication session based on the session identifier included in the response message 254, and may terminate the synchronous communication session.

On the other hand, if the communication server 202 determines that the response message 254 is not a complete response (for example, multiple request messages in addition to the request message 252 have been generated and inserted in the downstream queue 232), the communication server 202 may continue to monitor the upstream queue 234 (and any other upstream queues) for other response messages corresponding to the service request from the service provider server 130. In some embodiments, the communication server 202 may transmit the output data from each response message to the service provider server 130 via the synchronous communication session as the response message is retrieved. In some embodiments, the communication server 202 may temporarily store the output data in a data storage until all of the output data has been retrieved via the response messages from the processing server 206. The communication server 202 may then encapsulate the output data in a package (or in a stream of data), and transmit the data as a whole to the service provider server 130 via the synchronous communication session. When all of the output data is transmitted to the service provider server 130, the communication server 202 may terminate the synchronous communication session with the service provider server 130.

Based on service requests received from service provider servers 130 and 140 (and other service provider servers in the availability zone 'A'), the communication server 202 may continue to insert request messages into the downstream queue 232 (and/or other downstream queues) and retrieve response messages from the upstream queue 234 (and/or other upstream queues) to communicate with the processing server 206 and obtain output data. Similarly, the communication server 204 may also use the same technique to retrieve output data from the processing server 206. As discussed herein, the communication server 204 may insert any request messages (e.g., the request message 256) into the downstream queue 236 (which is a copy of the downstream queue 232). In some embodiments, the messaging server 220 may also provide a copy of the upstream queue 234 (e.g., the upstream queue 238) locally to the communication server 204 and may synchronize the upstream queues 234 and 238 (and any other copies of the upstream queue 234). As such, after the processing server 206 inserts the response message 258 into the upstream queue 234, the messaging server 220 may copy the response message 258 to other copies of the upstream queue 234, such as the upstream queue 238.

The communication server 204 may monitor and/or scan response messages from the upstream queue 238 to determine whether any response messages from the processing server 206 is relevant to the communication server 204 (e.g., based on the server identifier and/or the session identifier). When the communication server 204 determines that a response message (e.g., the response message 258) is relevant to the communication server 204, the communication server 204 may retrieve the response message 258 and remove the response message 258 from the upstream queue 238. The communication server 204 may extract the output data from the response message 258 and transmit the output data to the service provider server 150 via the synchronized communication session maintained between the communication server 204 and the service provider server 150.

Figure 3:
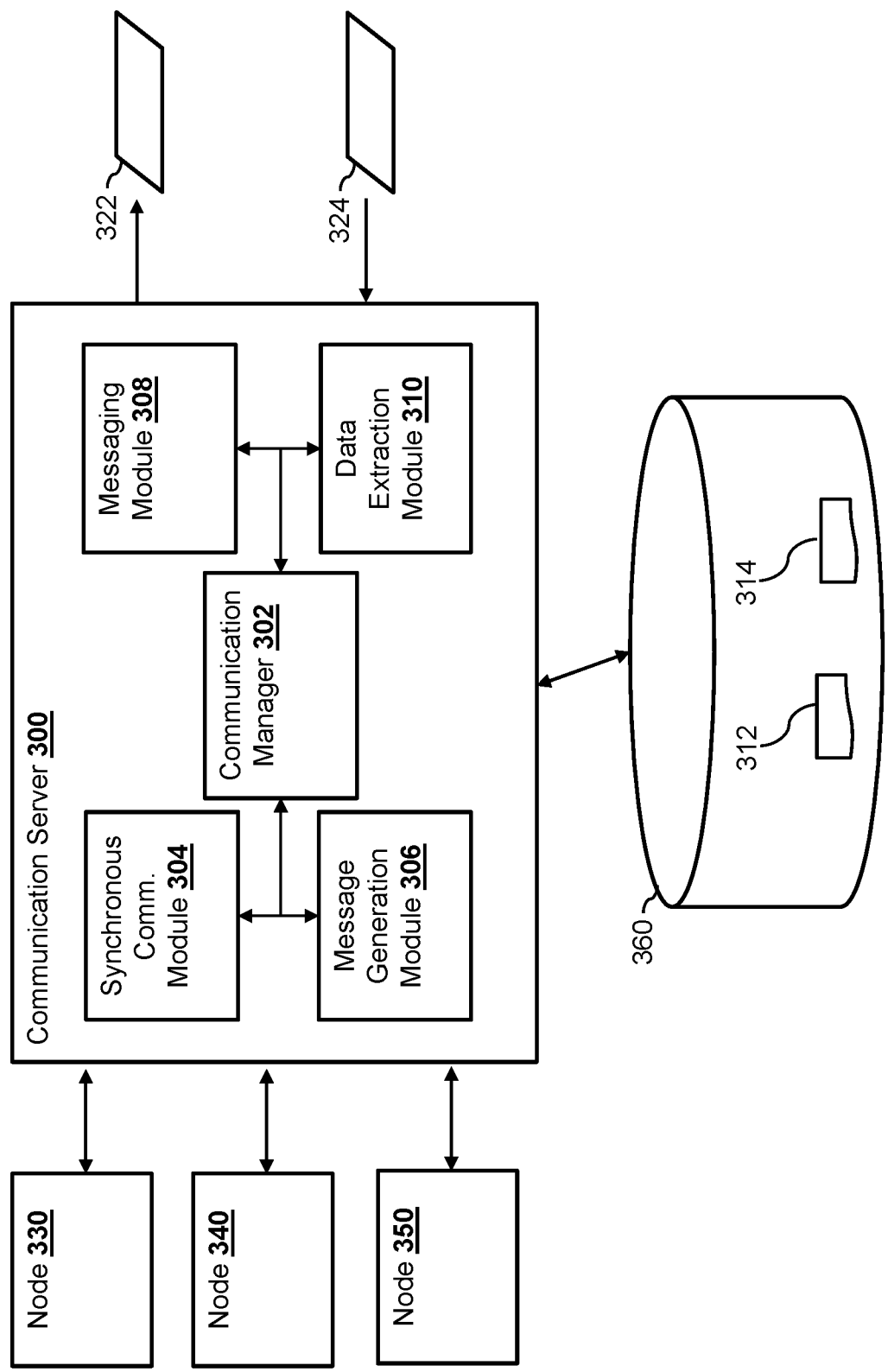
FIG. 3 is a block diagram illustrating a communication server according to an embodiment of the present disclosure.

FIG. 3 illustrates an example communication server 300 that can be used to implement any one of the communication servers 202 and 204. As shown, the communication server 300 includes a communication manager 302, a synchronous communication module 304, a message generation module 306, a messaging module 308, and a data extraction module 310. The communication server 300 is in communication with nodes 330, 340, and 350. In some embodiments, the nodes 330, 340, and 350 may correspond to the service provider servers 130, 140, and 150. Any one of the nodes 330, 340, and 350 may transmit service requests to the communication server 300. Due to the nature of the nodes 330, 340, and 350, and how the nodes communicate with user devices, the synchronous communication module 304 of the communication server 300 may establish, in response to receiving a service request from a node, a synchronous communication session (e.g., a TCP/IP session) with the node. The synchronous communication module 304 may maintain the synchronous communication session (e.g., by periodically transmitting packets and acknowledging receipts of packets) with the node until the requested service is completed.

In some embodiments, the communication manager 302 may store information associated with the service request in a data storage 360. For example, the communication manager 302 may store a device identifier identifying the node, a session identifier identifying the synchronous communication session established with the node for the service request, and input data included in the service request for performing the computing services. The information associated with each service request may be stored as a distinct record (e.g., records 312, 314, etc.) in the data storage 360.

Based on the service request, the message generation module 306 may generate a request message, which may include the input data from the service request, the device identifier identifying the node, the session identifier identifying the synchronous communication session, and a server identifier identifying the communication server 300. The messaging module 308 may insert the request message into a downstream queue 322, which may then be accessed by a processing server. The messaging module 308 may also monitor and/or scan response messages in an upstream queue 324, and may determine whether any response message in the upstream queue 324 is relevant to the communication server 300. If the communication server 300 determines that a response message in the upstream queue 324 is relevant to the communication server 300, the messaging module 308 may retrieve the response message from the upstream queue 324. The data extraction module 310 may extract the output data from the response message. The communication manager 302 may then transmit the output data to the corresponding node via the synchronous communication session maintained with the node. After transmitting the output data, the synchronous communication module 304 may terminate the synchronous communication session.

Figure 4:
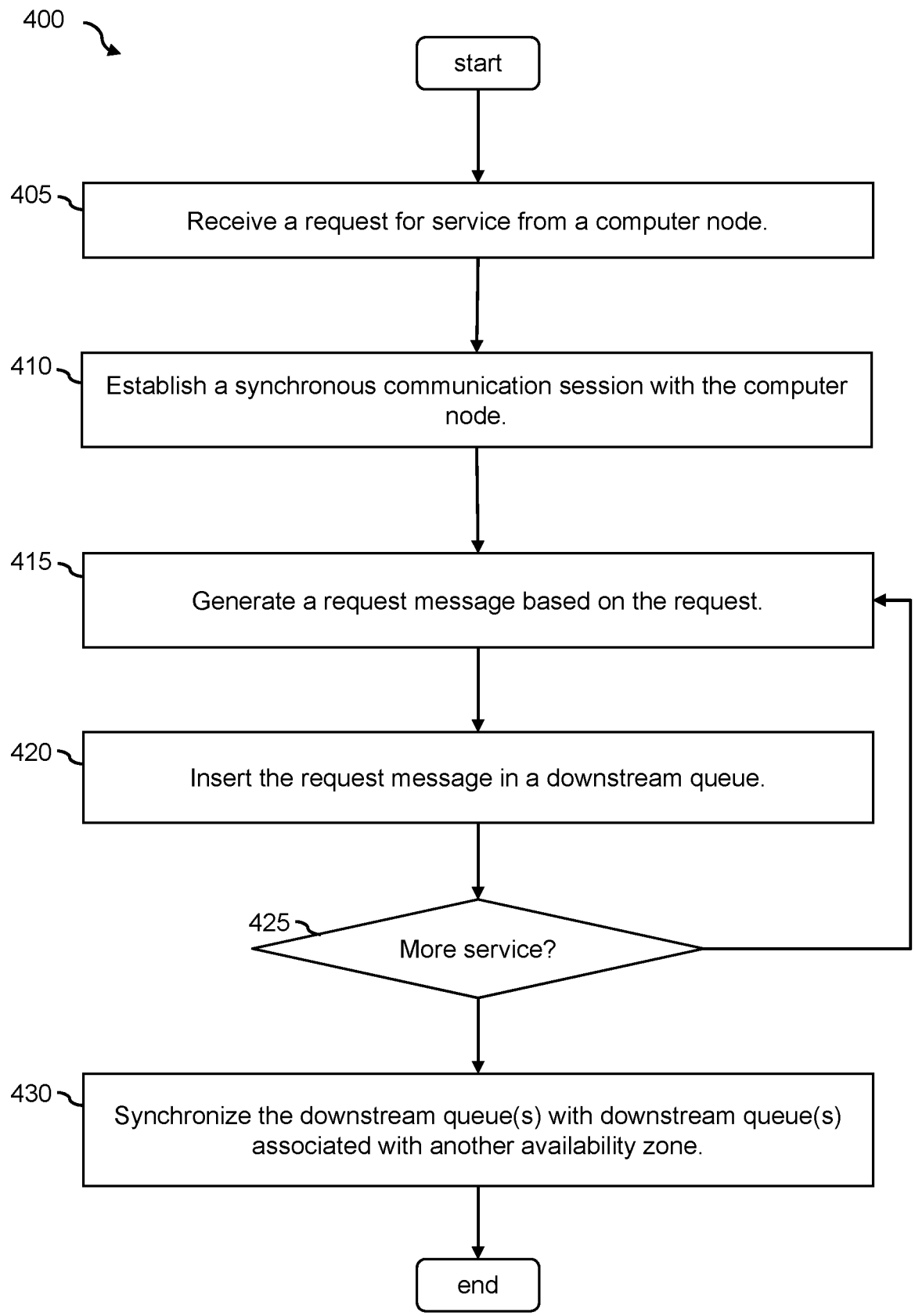
FIG. 4 is a flowchart showing a process of providing a communication mechanism to transmit service requests from computer nodes to a processing server according to an embodiment of the present disclosure.

FIG. 4 illustrates a process 400 for providing a communication mechanism to transmit service requests from computer nodes to a processing server configured to perform computing services according to various embodiments of the disclosure. In some embodiments, at least a portion of the process 400 may be performed by a communication server (e.g., the communication servers 202, 204, and/or 300) and the messaging server 220. The process 400 begins by receiving (at step 405) a request for service from a computer node. For example, the communication server 202 may receive a service request from the service provider server 130. The service request may require performance of certain computing services that can only be performed at a specialized computer such as the processing server 206.

The process 400 then establishes (at step 410) a synchronous communication session with the computer node. For example, the communication server 202 may establish a synchronous communication session with the service provider server 130, and may maintain the synchronous communication session with the service provider server 130 until the service request is processed, e.g., completed.

The process 400 generates (at step 415) a request message based on the request and insert (at step 420) the request message in a downstream queue. For example, the communication server 202 may generate a request message 252 based on the service request. The request message may include input data for the processing server 206 to perform the computing services. The communication server 202 may insert the request message 252 into the downstream queue 232.

The process 400 then determines (at step 425) if additional service is required based on the service request. If additional service is required based on the service request, the process 400 reverts back to the step 420 and generates an additional request message and inserts the additional request message into the downstream queue. If and when no additional service is required for the service request, the process then proceeds to step 430 by synchronizing the downstream queue(s) with downstream queue(s) associated with another availability zone. For example, the messaging server 220 may synchronize the downstream queue 232 with the downstream queue 236 such that any new request message(s) inserted into the downstream queue 236 (e.g., by the communication server 204) is copied to the downstream queue 232, and any request message(s) removed from the downstream queue 232 (by the processing server 206) is also removed from the downstream queue 236.

Figure 5:
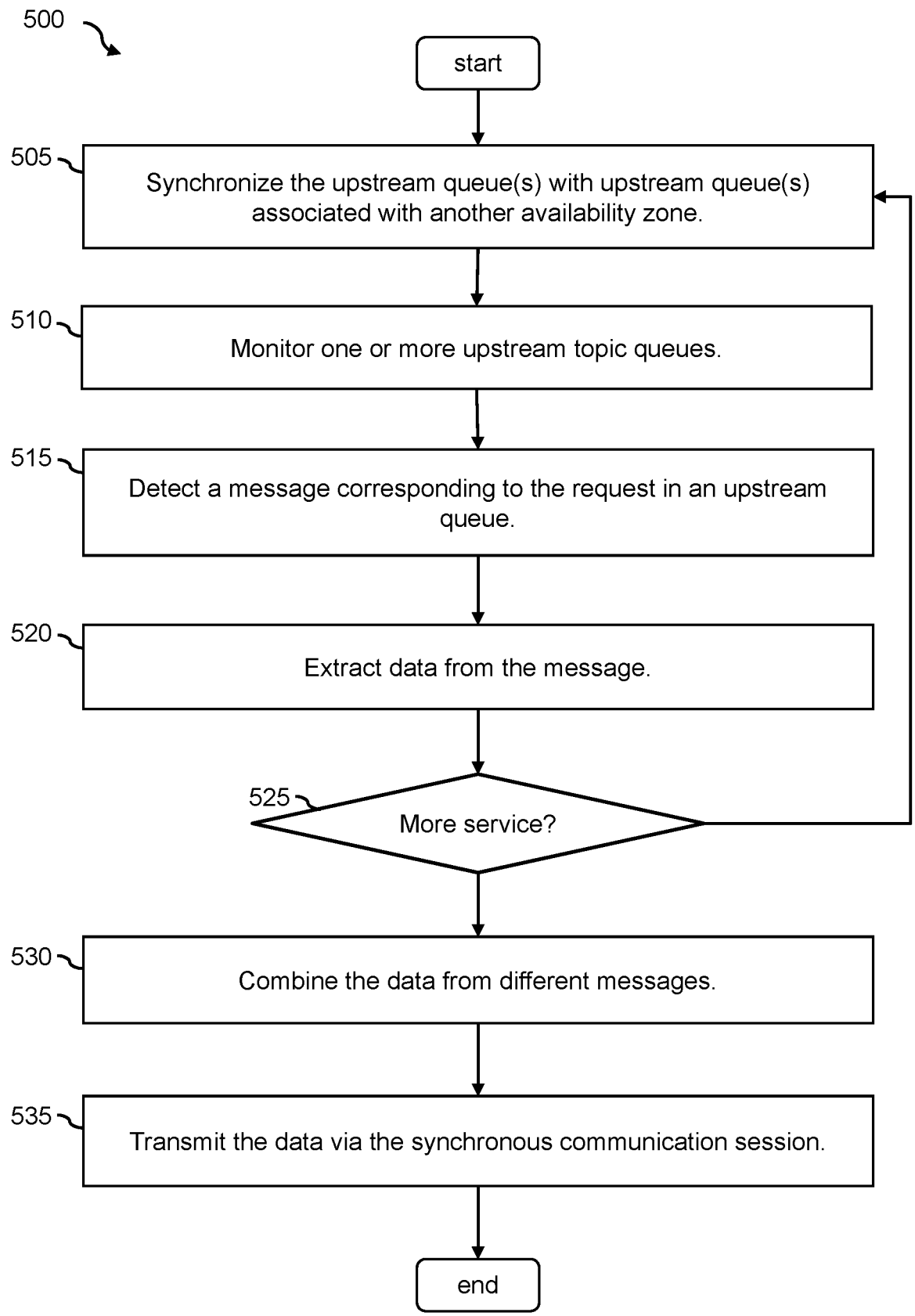
FIG. 5 is a flowchart showing a process of providing a communication mechanism to transmit responses from a processing server to computer nodes according to an embodiment of the present disclosure.

FIG. 5 illustrates a process 500 for providing a communication mechanism to transmit responses from a processing server configured to perform computing services to computer nodes according to various embodiments of the disclosure. In some embodiments, at least a portion of the process 500 may be performed by a communication server (e.g., the communication servers 202, 204, and/or 300) and the messaging server 220. The process 500 begins by synchronizing the upstream queue(s) with upstream queue(s) associated with another availability zone. For example, the messaging server 220 may synchronize the upstream queue 234 with the upstream queue 238, such that any response message(s) inserted by the processing server 206 into the upstream queue 234 may be copied to the upstream queue 238, and any response message(s) removed from the upstream queue 238 by the communication server 204 may be removed from the upstream queue 234.

The process 500 monitors (at step 510) one or more upstream queues, detects (at step 515) a message corresponding to the request in an upstream queue, and extracts (at step 520) data from the message. For example, the communication server 202 may monitor and scan response messages in the upstream queue 234, and may determine that a response message (e.g., the response message 254) is relevant to the communication server 202 based on the server identifier and/or the session identifier included in the response message 254 (e.g., the server identifier identifies the communication server 202 and/or the session identifier identifies a communication session that the communication server 202 is maintaining). The communication server 130 may then extract output data from the response message 254.

The process 500 determines (at step 525) if there are any more services waiting to be completed for the service request. If more services are still needed to be completed, the process 500 reverts back to the step 505 to synchronize the upstream queues, and iterates through the steps 510-520 until all of the services associated with the service request is completed. The process 500 then combines (at step 530) the data from different messages and transmits (at step 535) the data via the synchronized communication session.

Figure 6:
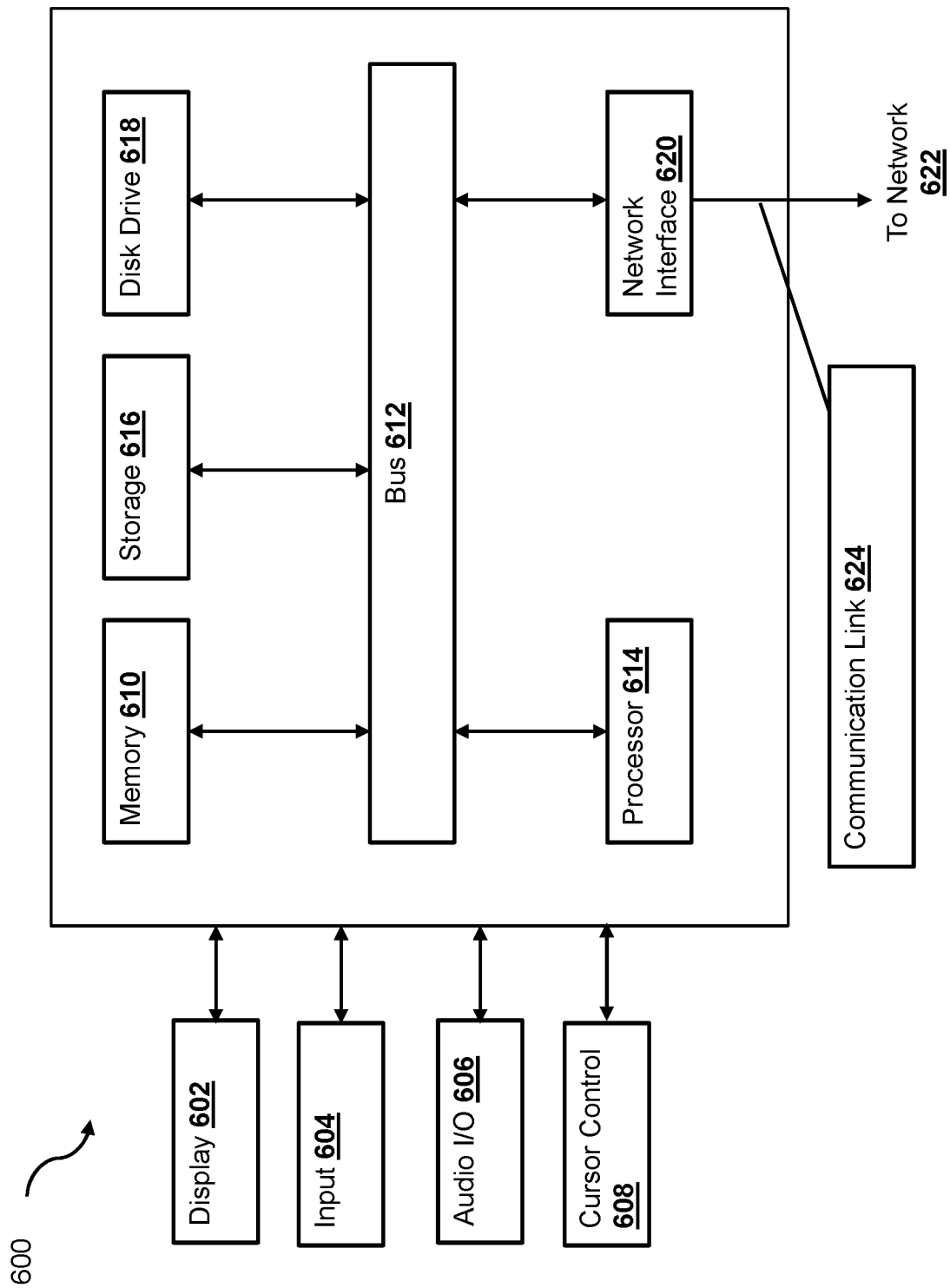
FIG. 6 is a block diagram of a system for implementing a device according to an embodiment of the present disclosure.

FIG. 6 is a block diagram of a computer system 600 suitable for implementing one or more embodiments of the present disclosure, including the service provider servers 130, 140, and 150, the user devices 110, 180, and 190, the communication servers 202, 204, and 300, and the messaging server 220. In various implementations, the user devices 110, 180, 190, and other user devices may include a mobile cellular phone, personal computer (PC), laptop, wearable computing device, etc. adapted for wireless communication, and each of the service provider servers 130, 140, and 150, the communication servers 202, 204, and 300, and the messaging server 220 (and other servers such as third-party servers) may include a network computing device, such as a server. Thus, it should be appreciated that the devices/servers 110, 120, 130, 140, 150, 180, 190, 202, 204, 300, and 220 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608

(such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via a network 622, such as network 160 of FIG. 1. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the functionalities associated with the scalable communication framework described herein according to the processes 400 and 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving a request for a service from a first computer node;
establishing a first synchronous communication session with the first computer node based on the request;
while maintaining the first synchronous communication session with the first computer node:
generating a first request message associated with the service, wherein the first request message comprises a first device identifier identifying the first computer node and a first session identifier identifying the first synchronous communication session;
inserting the first request message in a downstream messaging queue accessible by one or more processing servers hosting one or more machine learning models;
monitoring an upstream messaging queue accessible by the one or more processing servers;
detecting, based on the monitoring, a first response message comprising the first device identifier and the first session identifier; and
extracting first data from the first response message, wherein the first data comprises a first output from a first machine learning model of the one or more machine learning models;

transmitting the first data to the first computer node via the first synchronous communication session; and
subsequent to the transmitting the first data to the first computer node, terminating the first synchronous communication session.

2. The system of claim 1, wherein the operations further comprise:
determining that the service requires outputs from multiple machine learning models;
generating a second request message associated with the service; and
inserting the second request message in the downstream messaging queue.

3. The system of claim 2, wherein the operations further comprise:
subsequent to detecting the first response message, determining whether a second response message associated with the service has been detected in the upstream messaging queue.

4. The system of claim 3, wherein the operations further comprise:
pausing a transmission of the first data to the first client device;
detecting the second response message associated with the service in the upstream messaging queue;
extracting second data from the second response message; and
transmitting the first data and the second data to the first client device via the first synchronous communication session.

5. The system of claim 4, wherein the first data and the second data are transmitted as a data stream to the first client device.

6. The system of claim 1, wherein the first computer node is located within a first availability zone among a plurality of availability zones, wherein the downstream messaging queue is a first downstream messaging queue, wherein the upstream messaging queue is a first upstream messaging queue, and wherein the operations further comprise:
receiving a second request for the service from a second computer node located within a second availability zone from the plurality of availability zones;
establishing a second synchronous communication session with the second client device;
generating a third request message associated with the service for the second request; and
inserting the third request message in a second downstream messsaging queue.

7. The system of claim 6, wherein the first synchronous communication session and the second synchronous communication are maintained in parallel.

8. The system of claim 6, wherein the operations further comprise:
synchronizing the first downstream messaging queue and the second downstream messaging queue.

9. The system of claim 6, wherein the operations further comprise:
synchronizing the first upstream messaging queue associated with the first availability zone and a second upstream messaging queue associated with the second availability zone;
monitoring the second upstream messaging queue;
detecting, in the second upstream messaging queue based on the monitoring, a third response message comprising a second device identifier identifying the second computer node and a second session identifier identifying the second synchronous communication session;
extracting third data from the third response message, wherein the third data comprises a second output from the first machine learning model;
transmitting the third data to the second computer node via the second synchronous communication session; and
terminating the second synchronous session.

10. A method, comprising:
in response to receiving a first service request from a first computer node, establishing, by a first communication server, a first synchronous communication session with the first computer node;
generating, by the first communication server, a first request message based on the first service request;
inserting the first request message in a first downstream messaging queue associated with a messaging platform, wherein the first request message is accessible by one or more remote servers hosting one or more machine learning models based on the messaging platform;
monitoring a first upstream messaging queue associated with the messaging platform; and
in response to detecting, based on the monitoring, a first response message associated with the first service request, extracting, by the first communication server, first data from the first response message, wherein the first data comprises a first output from a first machine learning model of the one or more machine learning models;
transmitting, by the first communication server, the first data to the first computer node via the first synchronous communication session; and
subsequent to the transmitting the first data to the first client device, terminating, by the first communication server, the first synchronous communication session.

11. The method of claim 10, wherein the first machine learning model is configured to provide a summarized dialogue between a service provider and a user, and wherein the first data comprises a presentation of a first summarized dialogue associated with the user of the service provider.

12. The method of claim 10, further comprising:
synchronizing the first downstream messaging queue with a second downstream messaging queue accessible by the one or more remote servers, wherein the one or more remote servers are configured to retrieve the first request message from the second downstream messaging queue.

13. The method of claim 12, further comprising:
synchronizing the first upstream messaging queue with a second upstream messaging queue accessible by the one or more remote servers, wherein the one or more remote servers are configured to insert the first response message into the second upstream messaging queue, and wherein the synchronizing copies the response message from the second upstream messaging queue to the first upstream messaging queue.

14. The method of claim 10, wherein the first computer node is located within a first availability zone of a plurality of availability zones, wherein the one or more remote servers are located in a second availability zone of the plurality of availability zones, and wherein the first availability zone and the second availability zone are separated by one or more firewalls.

15. The method of claim 14, further comprising:
in response to receiving a second service request from a second computer node located within the second availability zone, establishing, by a second communication server, a second synchronous communication session with the second computer node;

generating, by the second communication server, a second request message based on the second service request; and inserting, by the second communication server, the second request message into a second downstream messaging queue.

16. A non-transitory machine-readable medium having stored thereon machine- readable instructions executable to cause a machine to perform operations comprising: receiving a service request from a first computer node; establishing, based on the service request, a first synchronous communication session with the first computer node; generating a first request message associated with the service request;

inserting the first request message in a downstream messaging queue associated with a messaging platform, wherein the first request message is accessible by one or more processing servers hosting one or more machine learning models based on the messaging platform;

monitoring an upstream messaging queue associated with the messaging platform; and detecting, based on the monitoring, a first response message associated with the service request;

extracting first data from the first response message, wherein the first data comprises a first output from a first machine learning model of the one or more machine learning models;

transmitting the first data to the first computer node via the first synchronous communication session; and subsequent to the transmitting the first data to the first computer node, terminating the first synchronous communication session.

17. The non-transitory machine-readable medium of claim 16, wherein the operations further comprise:

determining that the service request requires outputs from multiple machine learning models;

generating a second request message based on the service request; and inserting the second request message in the downstream messaging queue.

18. The non-transitory machine-readable medium of claim 17, wherein the operations further comprise:

detecting, based on the monitoring, a second response message associated with the service request in the upstream messaging queue; and extracting second data from the second response message.

19. The non-transitory machine-readable medium of claim 18, wherein the operations further comprise:

transmitting the second data to the first computer node via the first synchronous communication session before terminating the first synchronous communication session.

20. The non-transitory machine-readable medium of claim 18, wherein the operations further comprise:

generating a data stream based on the first data and the second data; and transmitting the data stream to the first computer node via the first synchronous communication session.

* * * * *